(12) United States Patent
Ryu et al.

(10) Patent No.: US 10,904,525 B2
(45) Date of Patent: Jan. 26, 2021

(54) VIDEO CODING METHOD AND APPARATUS UTILIZING COMBINATION OF DIVERSE BLOCK PARTITIONING STRUCTURES

(71) Applicant: INTELLECTUAL DISCOVERY CO., LTD., Seoul (KR)

(72) Inventors: Ho Chan Ryu, Seoul (KR); Yong Jo Ahn, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 16/378,492

(22) Filed: Apr. 8, 2019

(65) Prior Publication Data

US 2019/0238847 A1 Aug. 1, 2019

Related U.S. Application Data

(63) Continuation of application No. PCT/KR2016/011332, filed on Oct. 11, 2016.

(30) Foreign Application Priority Data

Oct. 10, 2016 (KR) .................. 10-2016-0130474

(51) Int. Cl.
*H04N 19/119* (2014.01)
*H04N 19/44* (2014.01)
(Continued)

(52) U.S. Cl.
CPC ......... *H04N 19/119* (2014.11); *H04N 19/157* (2014.11); *H04N 19/176* (2014.11);
(Continued)

(58) Field of Classification Search
CPC .. H04N 19/119; H04N 19/157; H04N 19/176; H04N 19/186; H04N 19/44; H04N 19/513; H04N 19/593
See application file for complete search history.

(56) References Cited

U.S. PATENT DOCUMENTS 8,487,959 B1 * 7/2013 Khan ............... G06T 11/00
345/619
8,824,562 B2 9/2014 Kim et al.
(Continued)

FOREIGN PATENT DOCUMENTS

KR 10-2010-0073554 A 7/2010
KR 10-2014-0034209 A 3/2014
(Continued)

OTHER PUBLICATIONS

International Search Report, PCT/KR2016/011332, dated Jul. 3, 2017, 12 pgs.

*Primary Examiner* — Jonathan R Messmore
(74) *Attorney, Agent, or Firm* — Sughrue Mion, PLLC

(57) ABSTRACT

The present invention relates to a block partitioning structure from among the video coding schemes and to a method and apparatus for encoding and decoding the block partitioning structure, the method comprising the steps of: acquiring block partitioning data; partitioning a block by means of the acquired block partitioning data; and encoding and decoding by means of the partitioned block. The encoding and decoding method and apparatus according to the present invention has the benefit of improving encoding efficiency with respect to the existing video compression schemes.

2 Claims, 9 Drawing Sheets

(51) Int. Cl.
  *H04N 19/186* (2014.01)
  *H04N 19/513* (2014.01)
  *H04N 19/593* (2014.01)
  *H04N 19/176* (2014.01)
  *H04N 19/70* (2014.01)
  *H04N 19/157* (2014.01)

(52) U.S. Cl.
  CPC ........... *H04N 19/186* (2014.11); *H04N 19/44* (2014.11); *H04N 19/513* (2014.11); *H04N 19/593* (2014.11); *H04N 19/70* (2014.11)

(56) References Cited

U.S. PATENT DOCUMENTS

| | | | |
|---|---|---|---|
| 2011/0255608 A1 | 10/2011 | Kim et al. | |
| 2013/0034153 A1* | 2/2013 | Song | H04N 19/159 375/240.03 |
| 2015/0063452 A1 | 3/2015 | Kim et al. | |
| 2015/0229926 A1* | 8/2015 | Puri | H04N 19/96 375/240.02 |
| 2015/0373332 A1* | 12/2015 | Kim | H04N 19/176 375/240.03 |
| 2018/0167618 A1* | 6/2018 | Lee | H04N 19/14 |

FOREIGN PATENT DOCUMENTS

| | | |
|---|---|---|
| KR | 10-2014-0139562 A | 12/2014 |
| KR | 10-2015-0027530 A | 3/2015 |
| KR | 10-2015-0096375 A | 8/2015 |

* cited by examiner

| | Descriptor |
|---|---|
| coding_unit( x0, y0, log2CbSize ) { | |
|   if( x0+( 1<<log2CbSize ) <= pic_width_in_luma_samples &&<br>    y0+( 1<<log2CbSize ) <= pic_height_in_luma_samples &&<br>    log2CbSize > MinCbLog2SizeY ) { | |
|     split_cu_flag[ x0 ][ y0 ] | ae(v) |
|   if( !split_cu_flag[ x0 ][ y0 ] ) { | |
|     binary_split_flag[ x0 ][ y0 ] | ae(v) |
|   if( binary_split_flag[ x0 ][ y0 ] ) | |
|     binary_direction_flag[ x0 ][ y0 ] | ae(v) |
| } | |
| } | |
| ... | |

410 — split_cu_flag row
420 — binary_split_flag row
430 — binary_direction_flag row

FIG. 4

VIDEO CODING METHOD AND APPARATUS UTILIZING COMBINATION OF DIVERSE BLOCK PARTITIONING STRUCTURES

RELATED APPLICATIONS

This application is a continuation application of the International Patent Application Serial No. PCT/KR2016/011332, filed Oct. 11, 2016, which claims priority to the Korean Patent Application Serial No. 10-2016-0130474, filed Oct. 10, 2016. Both of these applications are incorporated by reference herein in their entireties.

TECHNICAL FIELD

The present invention relates to an image processing scheme and, more particularly, to a block partitioning structure in video compression schemes, and a method and an apparatus for performing the partitioning on the block partitioning structure.

BACKGROUND

As the demand for high-resolution, high-definition video increases, the need for high-efficiency video compression technology for next-generation video services has emerged. Based on this need, the standardized MPEG and VCEG jointly established the Joint Collaborative Team on Video Coding (JCT-VC) of the video compression standardization of H.264/AVC, and completed the standardization for HEVC, which is the latest international video compression standard established January 2013.

In the video compression technique, a block partitioning structure refers to a unit in which encoding and decoding are performed, and a unit to which main encoding and decoding techniques such as prediction and transform are applied. As the video compression technology develops, the magnitude of blocks for performing encoding and decoding is gradually increasing, and in terms of partitioning type of blocks, more various partitioning forms are supported. In addition, the video compression is performed using units subdivided according to roles of blocks as well as units for performing encoding and decoding. In the HEVC standard, video coding and decoding are performed using unit blocks subdivided according to a block partitioning structure of quad-tree type and roles of prediction and transform. In addition, various forms of block partitioning structures such as a Quad-Tree plus Binary-Tree (QTBT) which is a form of a combination of a quad-tree and a binary-tree, a block partitioning structure of any form, and the like have been proposed for improving video encoding efficiency.

SUMMARY

It is an object of the present invention to provide a method and apparatus capable of improving encoding efficiency compared to the existing video compression schemes by utilizing a combination of diverse block partitioning structures.

It is to be understood, however, that the technical scope of the present invention is not limited to the above-described technical problems, and other technical problems may exist.

In order to solve the above problems, a video coding method and apparatus according to an embodiment of the present invention includes a block partitioning information acquisition unit, a block partitioning performance unit, and a block encoding/decoding unit.

In order to solve the above problems, a video coding method and apparatus according to an embodiment of the present invention includes a block partitioning information parsing unit, a determination unit relating to whether an additional block partitioning information is required, and an additional block partitioning information acquisition unit.

In order to solve the above problems, a video coding method and apparatus according to an embodiment of the present invention includes a color format determination unit of a current picture, a luminance and chrominance component block magnitude comparing unit, an additional block partitioning information acquisition unit, and a block partitioning performance unit.

An object of the present invention is to provide a video coding method and apparatus that efficiently performs block partitioning and improves coding efficiency through the block partitioning in a video coding method and apparatus utilizing a combination of diverse block structures.

According to an embodiment of the present invention, encoding performance can be improved by utilizing a combination of diverse block partitioning forms.

BRIEF DESCRIPTION OF THE DRAWINGS

FIG. 4 is a table showing a syntax for supporting a block structure with various block partitioning according to an embodiment of the present invention.

DETAILED DESCRIPTION

Figure 1:
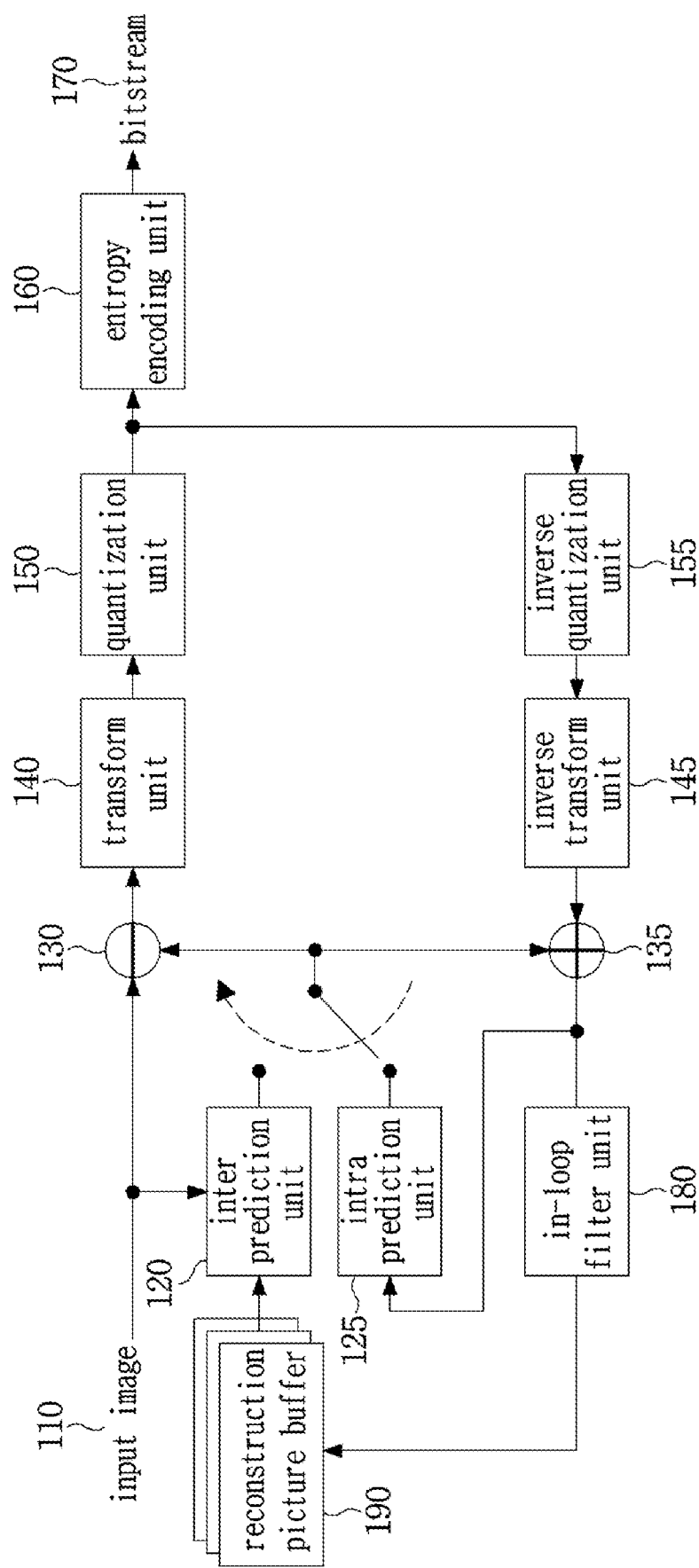
FIG. 1 is a block diagram showing a configuration of a video encoding apparatus according to an embodiment of the present invention.

Hereinafter, embodiments of the present invention will be described in detail with reference to the drawings attached thereto, so that those skilled in the art can easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only a case where they are directly connected but also a case where the part is electrically connected with another part in between.

In addition, when a part is referred to as 'comprising' an element throughout the specification, it is understood that the element may include other elements as well, without departing from the other elements unless specifically stated otherwise.

The term 'a step of doing something' or 'a step of something' used throughout this specification does not mean a step for something.

Also, the terms first, second, etc. may be used to describe various components, but the components should not be limited by the terms. The terms are used only for the purpose of distinguishing one component from another.

In addition, the components shown in the embodiments of the present invention are shown independently to represent different characteristic functions, but that does not mean that each component consists of separate hardware or one software constituent unit. That is, each component is described by arranging each component for convenience of explanation, and at least two components of components may be combined to form one component or one component may be partitioned into a plurality of components to perform functions. The integrated embodiments and the separate embodiments of each of these components are also included in the scope of the present invention without departing from the essence of the present invention.

In the various embodiments of the present invention described below, the color format refers to types of color components constituting one picture, and the encoding block or encoding unit may be collectively referred to as including a single block or a unit in which encoding and decoding are performed in video coding. The color format is not limited to a YUV format, and may be collectively referred to as including all kinds of a plurality of color formats according to color components for constituting one picture.

Hereinafter, a video coding method and apparatus utilizing a combination of diverse block partitioning structures proposed according to an embodiment of the present invention will be described in detail with reference to FIG. 9.

Figure 9:
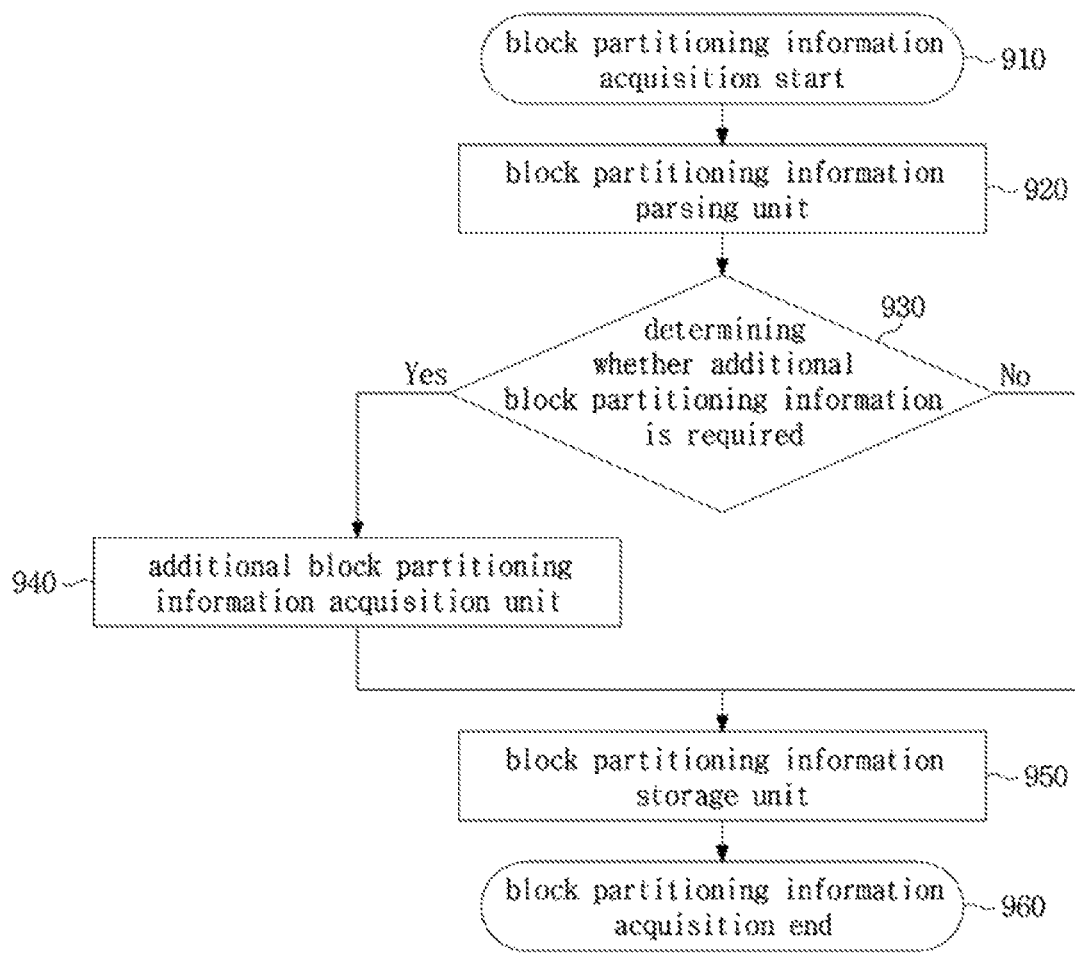
FIG. 9 is a flowchart of a block partitioning performance unit according to an embodiment of the present invention.

FIG. 9 is a flowchart of a block partitioning performance unit according to an embodiment of the present invention.

The block partitioning information acquiring unit 830 according to one embodiment includes a block partitioning information parsing unit 920, an additional block partitioning information determination unit 930, an additional block partitioning information acquisition unit 940, and a block partitioning information storage unit 950.

The block partitioning information parsing unit 930 performs parsing on block partitioning information from the bitstream to acquire the block partitioning information.

The additional block partitioning information determination unit 930 determines whether additional partitioning information is required in partitioning the current block by using a color format of current picture, block depth information, block position information within a picture, block size information, and the like.

When the additional block partitioning information determination unit 930 determines that the additional block partitioning information is needed, the additional block partitioning information acquisition unit 940 acquires additional block partitioning information required for determining the block partitioning structure of the current block. The additional block partitioning information required for determining the partitioning structure of the current block may be obtained by parsing from the bitstream or obtained using the color format of current picture, the block depth information, the block position information within the picture, the size information of the block, and the like without parsing from the bitstream.

The block partitioning information storage unit 950 stores the block partitioning information acquired by the block partitioning information parsing unit 920 and the additional block partitioning information acquisition unit 940.

Hereinafter, embodiments of the present invention will be described in detail with reference to the drawings attached thereto, so that those skilled in the art can easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only a case where they are directly connected but also a case where the part is electrically connected with another part in between.

In addition, when a part is referred to as 'comprising' an element throughout the specification, it is understood that the element may include other elements as well, without departing from the other elements unless specifically stated otherwise.

The term 'a step of doing something' or 'a step of something' used throughout this specification does not mean a step for something.

Also, the terms first, second, etc. may be used to describe various components, but the components should not be limited by the terms. The terms are used only for the purpose of distinguishing one component from another.

In addition, the components shown in the embodiments of the present invention are shown independently to represent different characteristic functions, and that does not mean that each component consists of separate hardware or one software constituent unit. That is, each component is described by arranging each component for convenience of explanation, and at least two components of components may be combined to form one component or one component may be partitioned into a plurality of components to perform functions. The integrated embodiments and the separate embodiments of each of these components are also included in the scope of the present invention without departing from the essence of the present invention.

In the various embodiments of the present invention described below, the color format refers to types of color components constituting one picture, and the encoding block or encoding unit may be collectively referred to as including a single block or a unit in which encoding and decoding are performed in video coding. The color format is not limited to a YUV format, and may be collectively referred to as including all kinds of a plurality of color formats according to color components for constituting one picture.

Hereinafter, a video coding method and apparatus utilizing a combination of diverse block partitioning structures proposed according to an embodiment of the present invention will be described in detail with reference to FIG. 9.

FIG. 1 is a block diagram illustrating a video encoding method and apparatus according to an embodiment of the present invention.

The video encoding method and apparatus according to an embodiment includes an inter prediction unit 120, an intra prediction unit 125, a subtraction unit 130, a transform unit 140, a quantization unit 150, an entropy encoding unit 160, an inverse transform unit 145, an inverse quantization unit 155, an adding unit 135, an in-loop filter unit 180, and a reconstruction picture buffer 190.

The inter prediction unit 120 performs motion prediction by using the input image 110 and the reconstructed image stored in and the reconstruction picture buffer 190, thereby generating a prediction signal.

The intra prediction unit 125 performs spatial prediction by using pixel values of pre-reconstructed neighboring blocks that are adjacent to the current block to be encoded, thereby generating a prediction signal.

The subtraction unit 130 uses the input image and the prediction signal generated through the inter prediction unit 120 or the intra prediction unit 125, thereby generating a residual signal.

The transform unit 140 and the quantization unit 150 perform transform and quantization on the residual signal generated through the subtraction unit 130, thereby generating a quantized coefficient.

The entropy encoding unit 160 performs entropy encoding on the encoding information such as syntax elements and quantized coefficients defined in the video encoder, thereby outputting the bitstream.

The inverse transform unit 145 and the inverse quantization unit 155 receive the quantized coefficients and perform inverse quantization and inverse transform in order, thereby generating a reconstructed residual signal.

The adding unit 135 generates a reconstructed signal using the prediction signal generated through the inter prediction unit 120 or the intra prediction unit 125 and the reconstructed residual signal.

The reconstructed signal is transmitted to the in-loop filter unit 180. The reconstructed picture to which the filtering is applied is stored in the reconstruction picture buffer 190, and may be used as a reference picture in the inter prediction unit 120.

Figure 2:
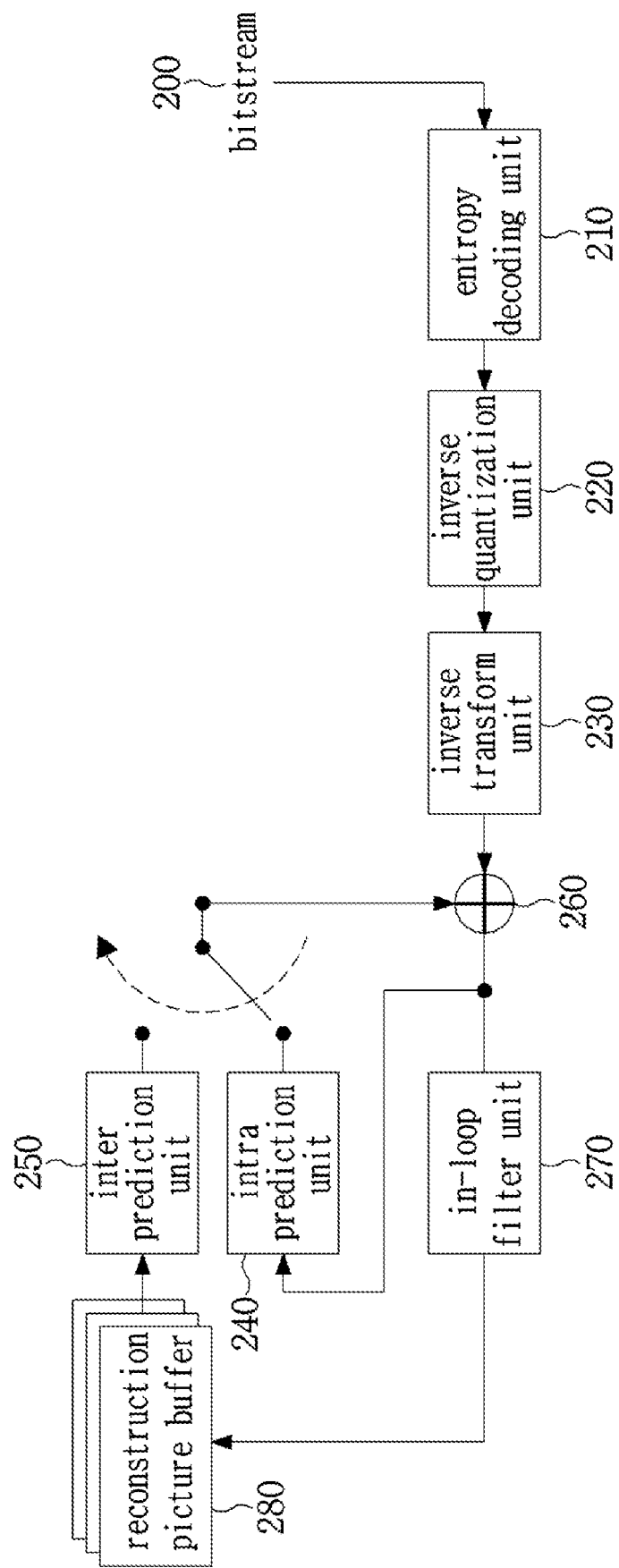
FIG. 2 is a block diagram illustrating a configuration of a video decoding apparatus according to an embodiment of the present invention.

FIG. 2 is a block diagram showing the configuration of a video decoding apparatus and method according to an embodiment of the present invention.

The video decoding apparatus and method according to one embodiment includes an entropy decoding unit 210, an inverse quantization unit 220, an inverse transform unit 230, an intra prediction unit 240, an inter prediction unit 250, adding unit 260, an in-loop filter unit 270, and a reconstruction picture buffer 280.

The entropy decoding unit 210 decodes the input bitstream 200 and outputs decoding information such as syntax elements and quantized coefficients.

The inverse quantization unit 220 and the inverse transform unit 230 receive a quantizated coefficient and perform inverse quantization and inverse transform in order, thereby outputting a residual signal.

The intra prediction unit 240 performs spatial prediction by using pixel values of the pre-reconstructed neighboring blocks adjacent to the current block to be decoded, thereby generating a prediction signal.

The inter prediction unit 250 performs motion compensation using a motion vector extracted from the bitstream and a reconstructed picture stored in the reconstruction picture buffer 280, thereby generating a prediction signal.

The prediction signals output from the intra prediction unit 240 and the inter prediction unit 250 are summed with the residual signal through the adding unit 260 and the reconstructed signal generated on a per-block basis includes the reconstructed image.

The reconstructed image is transferred to the in-loop filter unit 270. The reconstructed picture to which the filtering is applied is stored in the reconstruction picture buffer 280 and may be used as a reference picture in the inter prediction unit 250.

Figure 3:
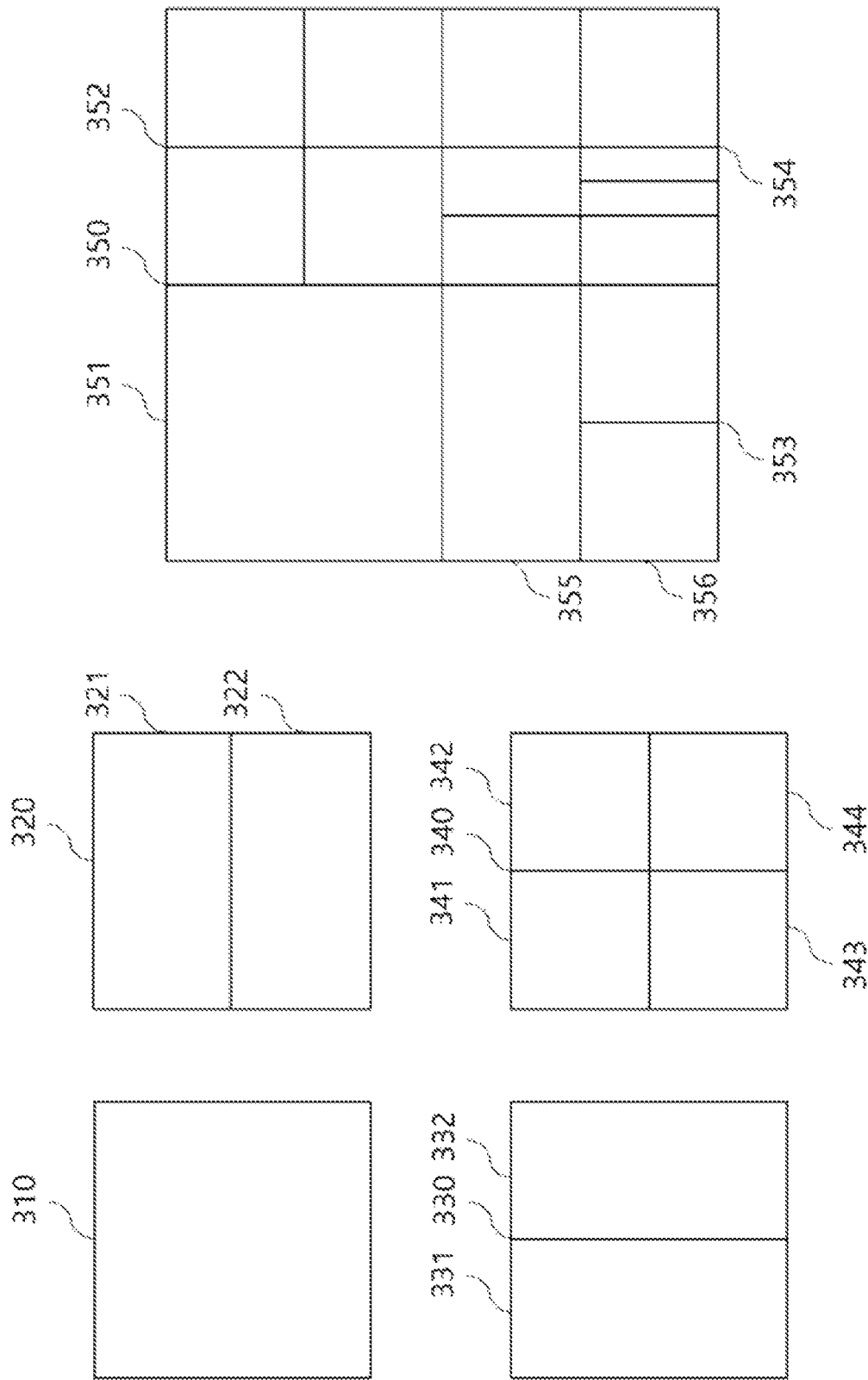
FIG. 3 is a conceptual diagram illustrating types of various block partitioning and blocks with various block partitioning according to an embodiment of the present invention.

FIG. 3 is a conceptual diagram illustrating types of various block partitioning and blocks with various block partitioning according to an embodiment of the present invention.

A video coding method and apparatus utilizing diverse block partitioning according to an embodiment includes block partitioning forms including a non-partitioned block 310, a horizontally partitioned block 320, a vertically partitioned block 330, four-partitioned block 340, and a block structure 350 having diverse block partitioning.

According to an embodiment, the non-partitioned block 310 includes a form in which one encoding block is not partitioned, and the horizontally partitioned block 320 according to an embodiment includes a form in which one encoding block is horizontally partitioned. In addition, the vertically partitioned block 330 according to an embodiment includes a form in which one encoding block is vertically partitioned, and the four-partitioned block 340 includes a form in which one encoding block is vertically and horizontally partitioned. The one encoding block includes both a square block and a non-square block.

The block structure 350 having diverse block partitioning according to an embodiment includes a block structure of a form in which blocks 310, 320, 330, and 340 of diverse block partitioning forms are combined. In the block partitioning structure according to the embodiment, the most upper block 350 may be partitioned into four sub-blocks, i.e., a first sub-block 351, a second sub-block 352, a third sub-block 353, and a fourth sub-block 354. The first sub-block 351 according to an embodiment is a block represented by the block partitioning form of the block 310 of a non-partitioned form, and the second sub-block 352 is a block represented by block partitioning of the block 340 of a four-partitioned form. The one encoding block may be partitioned into one or more sub-blocks, and the partitioned sub-blocks may be repeatedly partitioned. The second sub-block 352 is partitioned into four sub-sub-blocks, and each sub-sub-block indicates a block represented by block partitioning of the non-partitioned block 310. The third sub-block 353 is a block represented by the block partitioning of the horizontally partitioned block 320 and the lower end rectangular block 356 of the sub-sub-blocks is a block represented by block partitioning of the vertically partitioned block 330. The fourth sub-block 354 is a block represented by block partitioning of the four-partitioned block 340, and the first sub-sub-block and the third sub-sub-block of the fourth sub-block are blocks represented by block partitioning of the vertically partitioned block 330. Herein, the third sub-sub-block represents an embodiment in which additional vertical partitioning is performed.

FIG. 4 is a table showing a syntax for supporting a block structure with various block partitioning according to an embodiment of the present invention.

The video coding method and apparatus according to an embodiment of the present invention includes partitioning information 410 regarding whether or not to partition a block into four sub-blocks, partitioning information 420 regarding whether or not to partition a block into two when the block is not partitioned into four sub-blocks, and direction information 430 regarding two-partitioning direction, in order to use a block structure of diverse block partition forms. The partitioning information 420 regarding whether or not to partition a block into two sub-blocks and the direction information 430 regarding two-partitioning direction include information necessary for partitioning one encoding block into two sub-blocks, and may be transmitted in a form of two flags or in a form of information combined into one.

Figure 5:
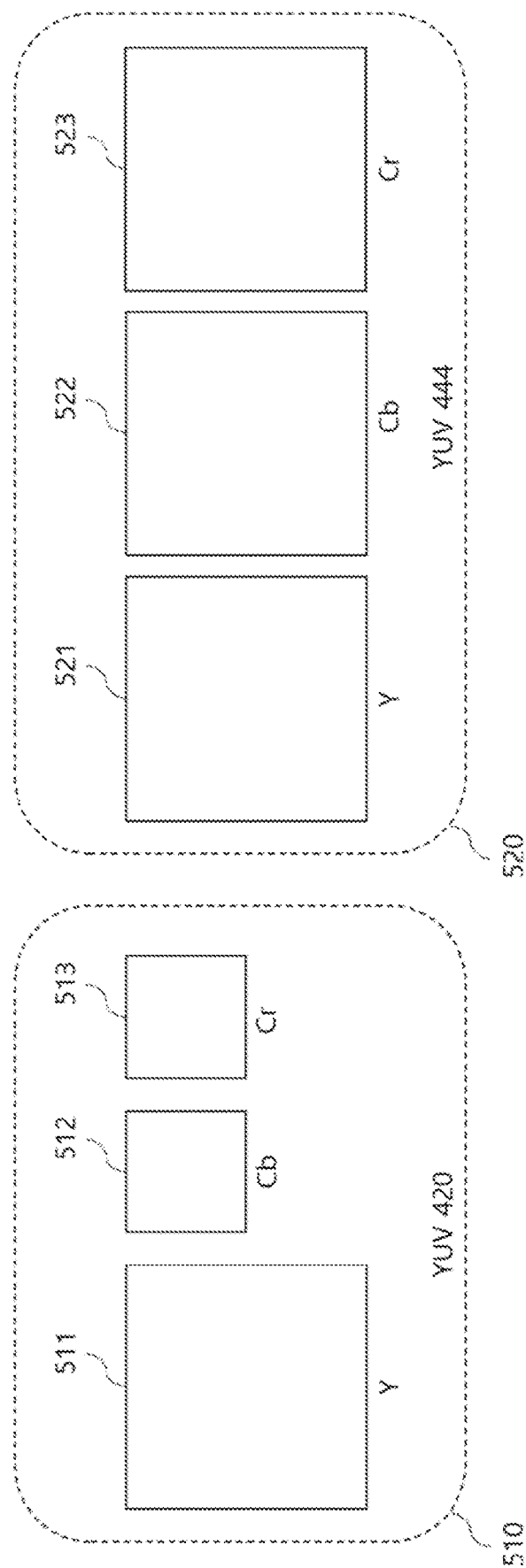
FIG. 5 shows an example of a color element according to a color format for one block according to an embodiment of the present invention.

FIG. 5 illustrates an example of a color element according to a color format for one block according to an embodiment of the present invention.

As an example of color element according to color format according to an embodiment of the present invention, among color formats, this specification shows a YUV 420 format 510 in which a size of a luminance component is different from a size of a chrominance component, and a YUV 444 format 520 in which a size of a luminance component is the same as a size of a chrominance component. In case of the color format in which the luminance component and the chrominance component are different from each other in size, a size of the luminance component block 511 and the chrominance component blocks 512 and 513 is different from each other in constructing one encoding block. In case of the color format in which the luminance component and the chrominance component is the same in the size, the size of the luminance component block 521 and the chrominance component blocks 522 and 523 is the same in constructing one encoding block. However, in the present specification, the color format in which the size of the luminance component and the chrominance component is different from or the same as each other is not limited to the color format constituted with the luminance component and the chrominance component, and includes classification according to component rate of each color element, such as various color formats such as RGB, XYZ, and the like.

Figure 6:
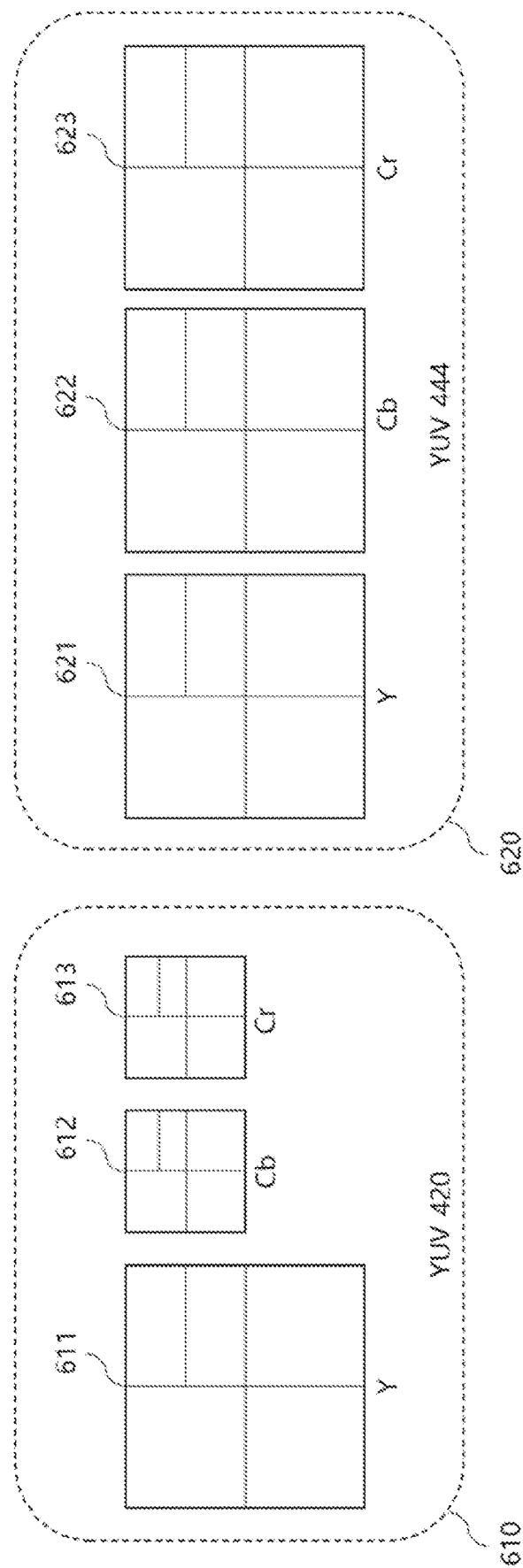
FIG. 6 shows an example in which a block partitioning structure is used in the same manner for each color element according to an embodiment of the present invention.

FIG. 6 shows an example in which a block partitioning structure is used in the same manner for each color element according to an embodiment of the present invention.

A video encoding method and apparatus according to an embodiment uses the same block partitioning structure in the luminance component block and the chrominance component block regardless of a color format. The video encoding method and apparatus according to an exemplary embodiment may determine block partitioning structures by using the same block partitioning information in the luminance component block 611 and the chrominance component blocks 612 and 613 of a color format 610 in which the size of the luminance component and the chrominance component is different from each other. The video encoding method and apparatus according to an exemplary embodiment may determine block partitioning structures by using the same block partitioning information in the luminance component block 621 and the chrominance component blocks 622 and 623 of a color format 620 in which the size of the luminance component and the chrominance component is the same.

Figure 7:
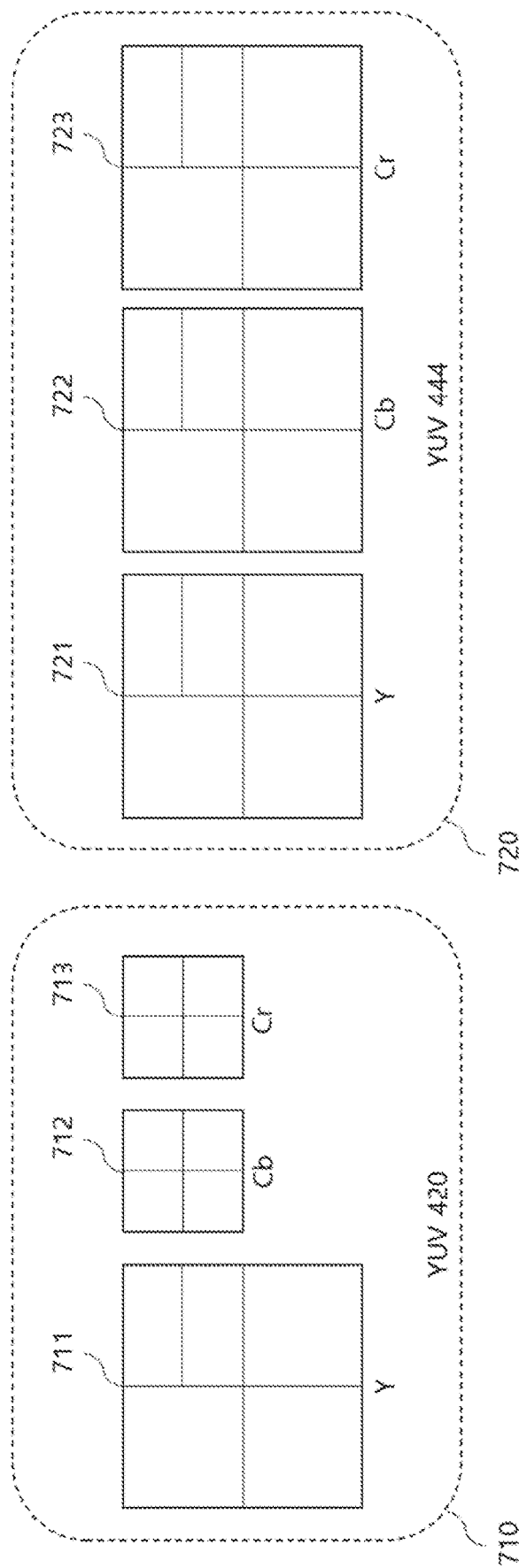
FIG. 7 shows an example in which a block partitioning structure is used differently for each color element according to an embodiment of the present invention.

FIG. 7 shows an example in which a block partitioning structure is used differently for each color element according to an embodiment of the present invention.

The video coding method and apparatus according to an embodiment selectively uses the same or different block partitioning structure in the luminance component block and the chrominance component block according to the color format. The video encoding method and apparatus according to an embodiment may determine block partitioning structures by using different block partitioning information in the luminance component block 711 and the chrominance component blocks 712 and 713 of a color format 710 in which the size of the luminance component and the chrominance component is different from each other. Herein, the luminance component block 711 and the chrominance component blocks 712 and 713 may be partitioned using different block partitioning structures, based on the block size and the encoding block partitioning depth information. In addition, the video encoding method and apparatus according to an embodiment may determine block partitioning structures by using the same block partitioning information in the luminance component block 721 and the chrominance component blocks 722 and 723 of a color format 720 in which the size of the luminance component and the chrominance component is the same.

The video coding method and apparatus according to an embodiment may selectively use the block partitioning structure of the luminance component blocks 711 and 712 and the chrominance component blocks 712, 713, 722, and 723, in accordance with the color format 710 in which the size of the luminance component and the chrominance component is different from each other and the color format 720 in which the size of the luminance component and the chrominance component is the same.

Figure 8:
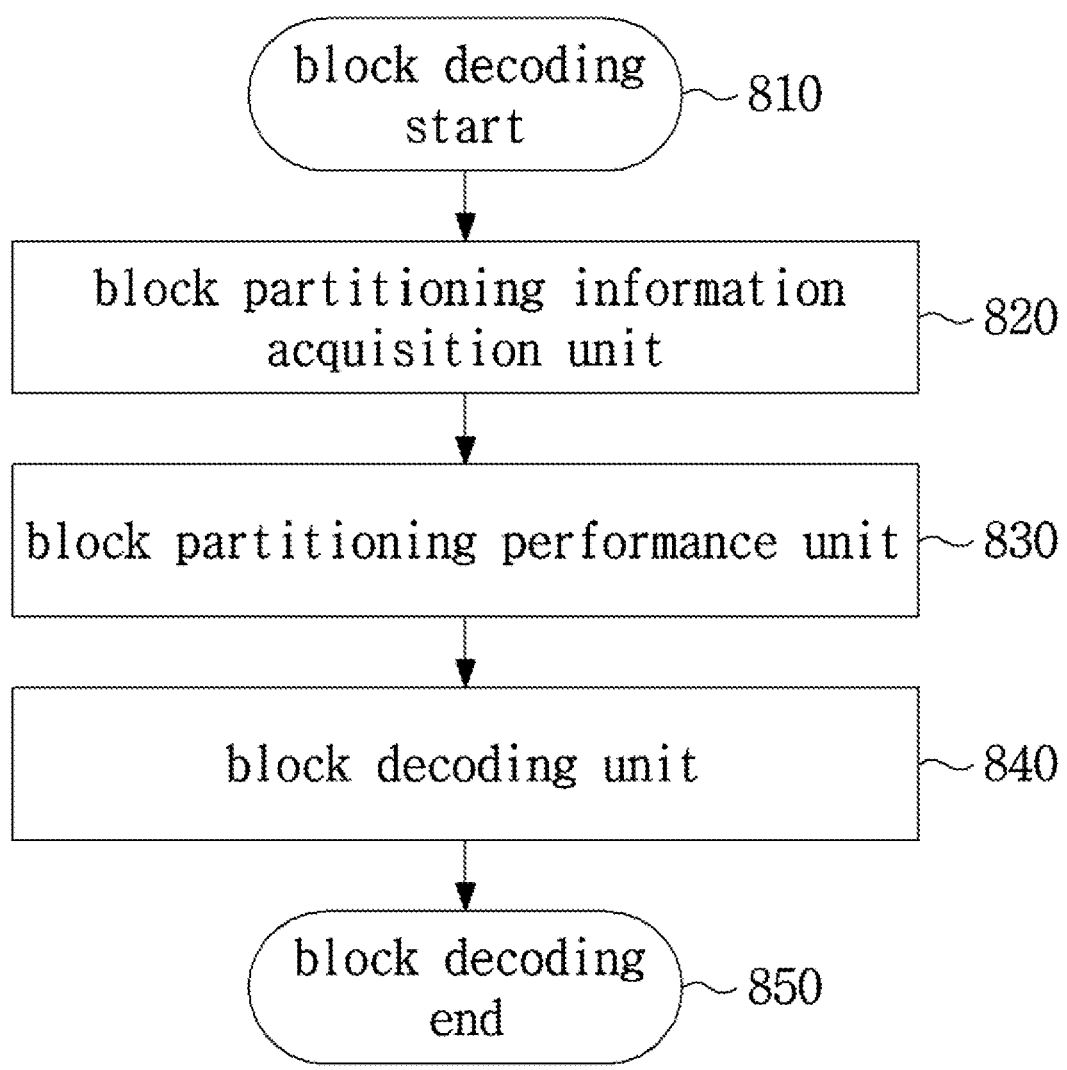
FIG. 8 is a flowchart illustrating the performing of partitioning and decoding on blocks in a video decoder according to an embodiment of the present invention.

FIG. 8 is a flowchart illustrating the performing of partitioning and decoding on blocks in a video decoder according to an embodiment of the present invention.

The video coding method and apparatus according to an embodiment may include a block partitioning information acquisition unit 820, a block partitioning performance unit 830, and a block decoding unit 840.

The block partitioning information acquisition unit 820 acquires and outputs encoding information on block partitioning from the bitstream.

The block partitioning performance unit 830 performs block partitioning using the encoding information on the block partitioning extracted by the block partitioning information acquisition unit 820.

The block decoding unit 840 performs decoding on each decoding unit partitioned through the block partitioning performance.

The present invention can be used for manufacturing such as broadcasting equipment manufacturing, terminal manufacturing, and the like, and industries related to source technology.

What is claimed is:

1. A video decoding method, comprising:
    acquiring, from a bitstream, block partitioning information of a current block having a tree-based partitioning structure;
    performing block partitioning on the current block by using the acquired block partitioning information; and
    decoding sub-blocks resulting from the block partitioning on the current block,
    wherein the block partitioning information includes first partitioning information indicating whether or not to partition a block into four sub-blocks, second partitioning information indicating whether or not to partition a block into two sub-blocks and partitioning direction information indicating whether a direction of the block partitioning is a horizontal direction or a vertical direction, and
    wherein the second partitioning information and the partitioning direction information is respectively acquiring from the bitstream,
    wherein acquiring the block partitioning information comprises:
        parsing the first partitioning information from the bitstream;
        determining whether additional block partitioning information is required, according to at least one of the parsed first partitioning information, partitioning depth information of the current block, or a size of the current block; and parsing the additional block partitioning information from the bitstream, in response to the determination that the additional block partitioning information is required, wherein the additional block partitioning information includes the second partitioning information and the partitioning direction information, wherein the current block is divided into a luminance component block and a chrominance component block; and wherein the block partitioning information is parsed for the luminance component block and the chrominance component block, respectively, wherein performing the block partitioning on the current block comprises:
  determining a block partitioning structure of the luminance component block based on the block partitioning information of the luminance component block; and
  determining a block partitioning structure of the chrominance component block based on the block partitioning information of the chrominance component block, and wherein the block partitioning structure of the chrominance component block is determined independent of the luminance component block.

2. A video encoding apparatus, performing:

determining block partitioning information of a current block having a tree-based partitioning structure;

performing block partitioning on the current block by using the block partitioning information; and encoding sub-blocks resulting from the block partitioning on the current block, wherein the block partitioning information includes first partitioning information indicating whether or not to partition a block into four sub-blocks, second partitioning information indicating whether or not to partition a block into two sub-blocks and partitioning direction information indicating whether a direction of the block partitioning is a horizontal direction or a vertical direction, and wherein the second partitioning information and the partitioning direction information is determined and encoded at the video encoding apparatus, respectively, wherein determining the block partitioning information comprises:
  determining the first partitioning information;
  determining whether additional block partitioning information is required, according to at least one of the determined first partitioning information, partitioning depth information of the current block, or a size of the current block, and
  determining the additional block partitioning information, in response to the determination that the additional block partitioning information is required, wherein the additional block partitioning information includes the second partitioning information and the partitioning direction information, wherein the current block is divided into a luminance component block and a chrominance component block, wherein the block partitioning information is determined and encoded for the luminance component block and the chrominance component block, respectively, wherein performing the block partitioning on the current block comprises:
  determining a block partitioning structure of the luminance component block based on the block partitioning information of the luminance component block; and
  determining a block partitioning structure of the chrominance component block based on the block partitioning information of the chrominance component block, and wherein the block partitioning structure of the chrominance component block is determined independent of the luminance component block.

\* \* \* \* \*